United States Patent
Raghoebardajal et al.

(10) Patent No.: US 11,983,306 B2
(45) Date of Patent: May 14, 2024

(54) PERIPHERAL TRACKING SYSTEM AND METHOD

(71) Applicant: Sony Interactive Entertainment Europe Limited, London (GB)

(72) Inventors: Sharwin Winesh Raghoebardajal, London (GB); Simon Pilgrim, London (GB); Steven Tattersall, London (GB); Jose Rubio, London (GB)

(73) Assignee: Sony Interactive Entertainment Europe Limited (GB)

( * ) Notice: Subject to any disclaimer, the term of this patent is extended or adjusted under 35 U.S.C. 154(b) by 0 days.

(21) Appl. No.: 18/069,448

(22) Filed: Dec. 21, 2022

(65) Prior Publication Data
US 2023/0214006 A1 Jul. 6, 2023

(30) Foreign Application Priority Data
Dec. 31, 2021 (GB) .................................. 2119153

(51) Int. Cl.
*G06F 3/01* (2006.01)
*G06F 3/0346* (2013.01)

(52) U.S. Cl.
CPC ............ *G06F 3/011* (2013.01); *G06F 3/0346* (2013.01)

(58) Field of Classification Search
CPC ...... G06F 3/011; G06F 3/0325; G06F 3/0346; G06F 3/0354; G02B 27/017; G01P 15/00; G06T 7/00; G06T 19/006
See application file for complete search history.

(56) References Cited

U.S. PATENT DOCUMENTS

| | | | |
|---|---|---|---|
| 2008/0170123 A1* | 7/2008 | Albertson | G06T 7/20 348/157 |
| 2017/0018121 A1* | 1/2017 | Lawson | G06V 40/10 |

(Continued)

FOREIGN PATENT DOCUMENTS

EP  2356546 B1  10/2013

OTHER PUBLICATIONS

Extended European Search Report including Written Opinion for Application No. 22213418.1 dated May 8, 2023, pp. 1-8.
(Continued)

*Primary Examiner* — Ryan A Lubit
(74) *Attorney, Agent, or Firm* — Lerner David LLP

(57) ABSTRACT

A system configured to track the location of one or more peripherals operated by a user, the system comprising a tracking unit configured to determine a location of the one or more peripherals in dependence upon images captured by a camera associated with an HMD worn by the user, a generation unit configured to generate, in response to a determination by the tracking unit that one or more of the peripherals is not visible in the images, an array of home points behind the user, the home points being locations defined in dependence upon constraints upon the user's motion, an estimation unit configured to estimate the respective locations of non-visible peripherals in dependence upon the output of one or more inertial measurement units associated with each peripheral, and a selection unit configured to select a home point, from amongst the array of home points, for each of the non-visible peripherals, wherein the tracking unit is configured to generate a location for each non-visible peripheral such that the location converges towards the selected home point.

14 Claims, 5 Drawing Sheets

(56) References Cited

U.S. PATENT DOCUMENTS

| | | | | |
|---|---|---|---|---|
| 2017/0358139 A1* | 12/2017 | Balan | ............... | G02B 27/017 |
| 2019/0318501 A1* | 10/2019 | Balan | ............... | A63F 13/212 |
| 2019/0339767 A1* | 11/2019 | Andrew | ............... | G06F 3/017 |
| 2019/0392554 A1* | 12/2019 | Andersson | ............ | G06F 3/011 |
| 2020/0201045 A1* | 6/2020 | Liu | ............... | H04N 23/56 |
| 2020/0372702 A1* | 11/2020 | Yan | ............... | G06F 3/011 |
| 2021/0216135 A1 | 7/2021 | Connellan et al. | | |
| 2022/0138979 A1* | 5/2022 | Adkinson | ............ | G06T 7/62 |
| | | | | 345/633 |

OTHER PUBLICATIONS

Search and Examination Report dated Jun. 23, 2022 from the Office Action for United Kingdom Application No. 2119153.1, pp. 1-3.

* cited by examiner

PERIPHERAL TRACKING SYSTEM AND METHOD

CROSS-REFERENCE TO RELATED APPLICATIONS

The present application claims priority from Great Britain Patent Application No. 2119153.1, filed on Dec. 31, 2021, the disclosure of which is hereby incorporated herein by reference.

BACKGROUND OF THE INVENTION

Field of the Invention

This disclosure relates to a peripheral tracking system and method.

Description of the Prior Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

In recent years there has been an increase in the demand for head-mountable display devices (HMDs) for use with virtual reality and augmented or mixed reality applications. In some cases this can be used to enhance a user's surroundings to increase productivity (such as providing overlays with extra information related to a task being performed by a user), while in others entertainment is the goal through the provision of games or video content (interactive or otherwise). This increase in demand has been driven in part by an improvement to display technologies, and in part due to an increase in processing power available to devices for generating immersive content.

Many users are able to interact with such devices using their hands only, with different hand signals being tied to different functions. In addition to this, one or more gestures or spoken commands may be used to increase functionality. In order to further increase the ability of a user to interact with such content, one or more control devices may be provided to allow the provision of inputs. In some cases, motion tracking of these peripherals may be performed so as to enable a more natural input method for a user. This motion tracking may be camera-based, or may utilise one or more inertial motion sensors such as accelerometers or gyroscopes to identify changes in position and/or orientation.

However, such tracking may fail under certain conditions. For instance, a camera-based tracking solution only works so long as images of a peripheral are able to be captured—when occluded, information about the location of the peripheral is lost and this can result in a loss of an ability to interact with content or even errors. Such issues may be particularly apparent in inside-out tracking arrangements (as opposed to outside-in tracking arrangements) due to the reduced tracking volume (that is, a volume in which tracking of a peripheral can be performed—based upon a camera field of view, for example) that is usually associated with such arrangements.

It is in the context of the above discussion that the present disclosure arises.

SUMMARY OF THE INVENTION

This disclosure is defined by claim 1.

Further respective aspects and features of the disclosure are defined in the appended claims.

It is to be understood that both the foregoing general description of the invention and the following detailed description are exemplary, but are not restrictive, of the invention.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
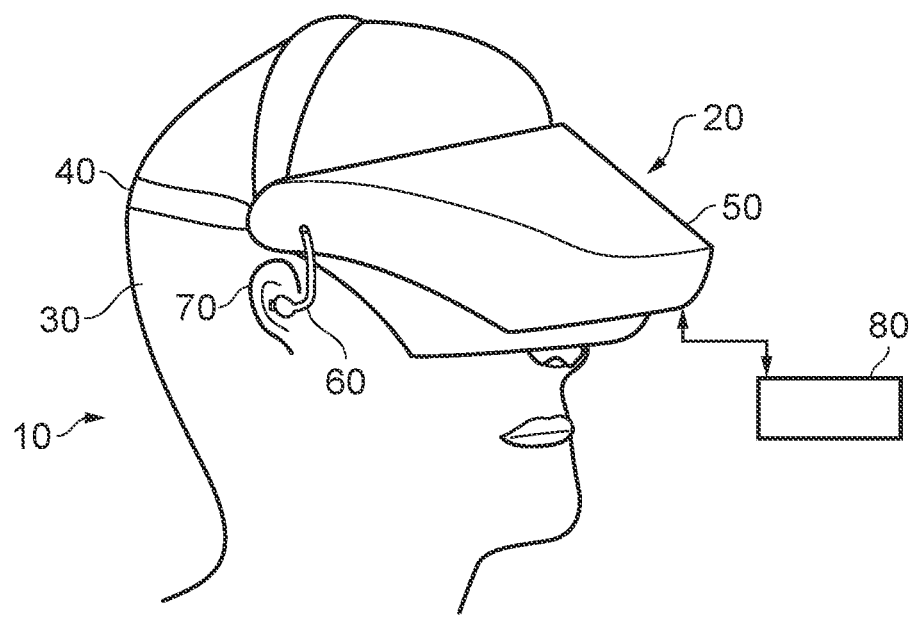
FIG. 1 schematically illustrates an HMD worn by a user.

Referring now to the drawings, wherein like reference numerals designate identical or corresponding parts throughout the several views, embodiments of the present disclosure are described.

Referring now to the drawings, wherein like reference numerals designate identical or corresponding parts throughout the several views, embodiments of the present disclosure are described. In FIG. 1, a user 10 is wearing an HMD 20 (as an example of a generic head-mountable apparatus—other examples including audio headphones or a head-mountable light source) on the user's head 30. The HMD comprises a frame 40, in this example formed of a rear strap and a top strap, and a display portion 50. As noted above, many gaze tracking arrangements may be considered particularly suitable for use in HMD systems; however, use with such an HMD system should not be considered essential.

Note that the HMD of FIG. 1 may comprise further features, to be described below in connection with other drawings, but which are not shown in FIG. 1 for clarity of this initial explanation.

The HMD of FIG. 1 completely (or at least substantially completely) obscures the user's view of the surrounding environment. All that the user can see is the pair of images displayed within the HMD, as supplied by an external processing device such as a games console in many embodiments. Of course, in some embodiments images may instead (or additionally) be generated by a processor or obtained from memory located at the HMD itself.

The HMD has associated headphone audio transducers or earpieces 60 which fit into the user's left and right ears 70. The earpieces 60 replay an audio signal provided from an external source, which may be the same as the video signal source which provides the video signal for display to the user's eyes.

The combination of the fact that the user can see only what is displayed by the HMD and, subject to the limitations of the noise blocking or active cancellation properties of the earpieces and associated electronics, can hear only what is provided via the earpieces, mean that this HMD may be considered as a so-called "full immersion" HMD. Note however that in some embodiments the HMD is not a full immersion HMD, and may provide at least some facility for the user to see and/or hear the user's surroundings. This could be by providing some degree of transparency or partial transparency in the display arrangements, and/or by projecting a view of the outside (captured using a camera, for example a camera mounted on the HMD) via the HMD's displays, and/or by allowing the transmission of ambient sound past the earpieces and/or by providing a microphone to generate an input sound signal (for transmission to the earpieces) dependent upon the ambient sound.

A front-facing camera may be provided to capture images to the front of the HMD, in use. Such images may be used for head tracking purposes, in some embodiments, while it may also be suitable for capturing images for an augmented reality (AR) style experience. A Bluetooth® antenna 124 may provide communication facilities or may simply be arranged as a directional antenna to allow a detection of the direction of a nearby Bluetooth transmitter.

In operation, a video signal is provided for display by the HMD. This could be provided by an external video signal source 80 such as a video games machine or data processing apparatus (such as a personal computer), in which case the signals could be transmitted to the HMD by a wired or a wireless connection. Examples of suitable wireless connections include Bluetooth® connections. Audio signals for the earpieces 60 can be carried by the same connection. Similarly, any control signals passed from the HMD to the video (audio) signal source may be carried by the same connection. Furthermore, a power supply (including one or more batteries and/or being connectable to a mains power outlet) may be linked by a cable to the HMD. Note that the power supply and the video signal source 80 may be separate units or may be embodied as the same physical unit. There may be separate cables for power and video (and indeed for audio) signal supply, or these may be combined for carriage on a single cable (for example, using separate conductors, as in a USB cable, or in a similar way to a "power over Ethernet" arrangement in which data is carried as a balanced signal and power as direct current, over the same collection of physical wires). The video and/or audio signal may be carried by, for example, an optical fibre cable. In other embodiments, at least part of the functionality associated with generating image and/or audio signals for presentation to the user may be carried out by circuitry and/or processing forming part of the HMD itself. A power supply may be provided as part of the HMD itself.

Some embodiments of the invention are applicable to an HMD having at least one electrical and/or optical cable linking the HMD to another device, such as a power supply and/or a video (and/or audio) signal source. So, embodiments of the invention can include, for example:
(a) an HMD having its own power supply (as part of the HMD arrangement) but a cabled connection to a video and/or audio signal source;
(b) an HMD having a cabled connection to a power supply and to a video and/or audio signal source, embodied as a single physical cable or more than one physical cable;
(c) an HMD having its own video and/or audio signal source (as part of the HMD arrangement) and a cabled connection to a power supply; or
(d) an HMD having a wireless connection to a video and/or audio signal source and a cabled connection to a power supply.

If one or more cables are used, the physical position at which the cable enters or joins the HMD is not particularly important from a technical point of view. Aesthetically, and to avoid the cable(s) brushing the user's face in operation, it would normally be the case that the cable(s) would enter or join the HMD at the side or back of the HMD (relative to the orientation of the user's head when worn in normal operation). Accordingly, the position of the cables relative to the HMD in FIG. 1 should be treated merely as a schematic representation.

Accordingly, the arrangement of FIG. 1 provides an example of a head-mountable display system comprising a frame to be mounted onto an observer's head, the frame defining one or two eye display positions which, in use, are positioned in front of a respective eye of the observer and a display element mounted with respect to each of the eye display positions, the display element providing a virtual image of a video display of a video signal from a video signal source to that eye of the observer.

FIG. 1 shows just one example of an HMD. Other formats are possible: for example an HMD could use a frame more similar to that associated with conventional eyeglasses, namely a substantially horizontal leg extending back from the display portion to the top rear of the user's ear, possibly curling down behind the ear. In other (not full immersion) examples, the user's view of the external environment may not in fact be entirely obscured; the displayed images could be arranged so as to be superposed (from the user's point of view) over the external environment. An example of such an arrangement will be described below with reference to FIG. 4.

Figure 2:
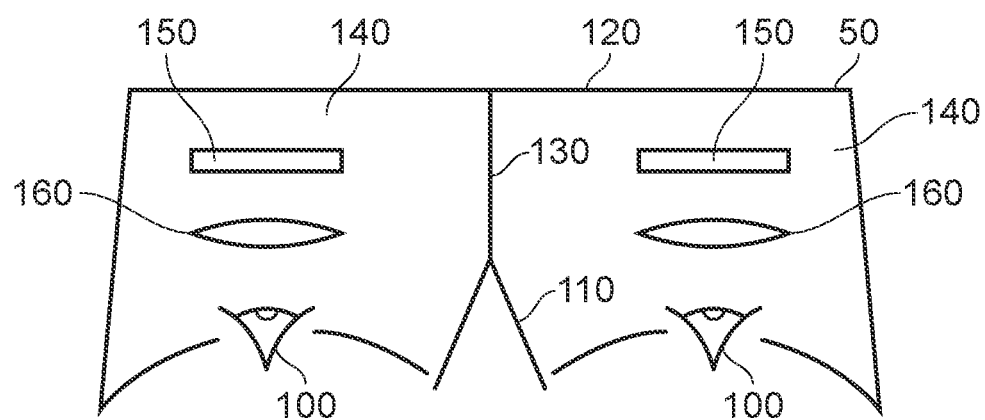
FIG. 2 is a schematic plan view of an HMD.

In the example of FIG. 1, a separate respective display is provided for each of the user's eyes. A schematic plan view of how this is achieved is provided as FIG. 2, which illustrates the positions 100 of the user's eyes and the relative position 110 of the user's nose. The display portion 50, in schematic form, comprises an exterior shield 120 to mask ambient light from the user's eyes and an internal shield 130 which prevents one eye from seeing the display intended for the other eye. The combination of the user's face, the exterior shield 120 and the interior shield 130 form two compartments 140, one for each eye. In each of the compartments there is provided a display element 150 and one or more optical elements 160. The way in which the display element and the optical element(s) cooperate to provide a display to the user will be described with reference to FIG. 3.

Figure 3:
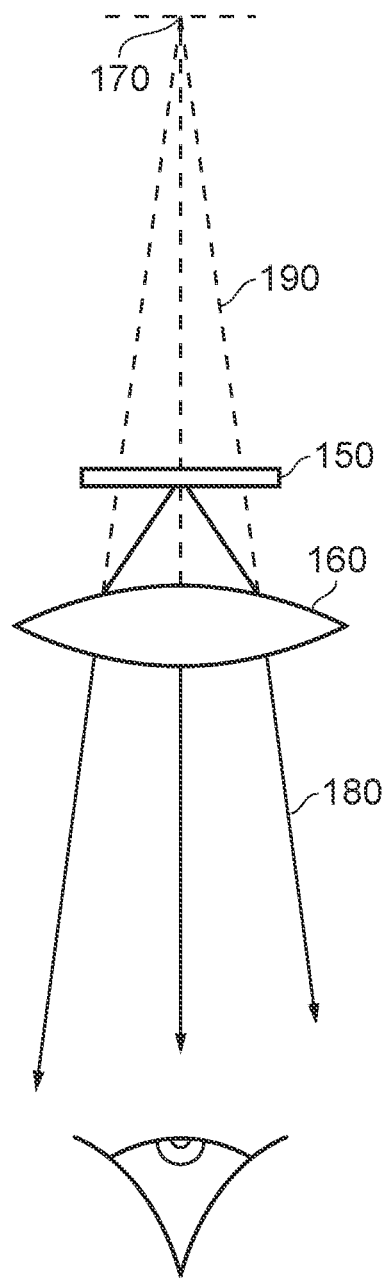
FIG. 3 schematically illustrates the formation of a virtual image by an HMD.

Referring to FIG. 3, the display element 150 generates a displayed image which is (in this example) refracted by the optical elements 160 (shown schematically as a convex lens but which could include compound lenses or other elements) so as to generate a virtual image 170 which appears to the user to be larger than and significantly further away than the real image generated by the display element 150. As an example, the virtual image may have an apparent image size (image diagonal) of more than 1 m and may be disposed at a distance of more than 1 m from the user's eye (or from the frame of the HMD). In general terms, depending on the purpose of the HMD, it is desirable to have the virtual image disposed a significant distance from the user. For example, if the HMD is for viewing movies or the like, it is desirable that the user's eyes are relaxed during such viewing, which requires a distance (to the virtual image) of at least several metres. In FIG. 3, solid lines (such as the line 180) are used to denote real optical rays, whereas broken lines (such as the line 190) are used to denote virtual rays.

Figure 4:
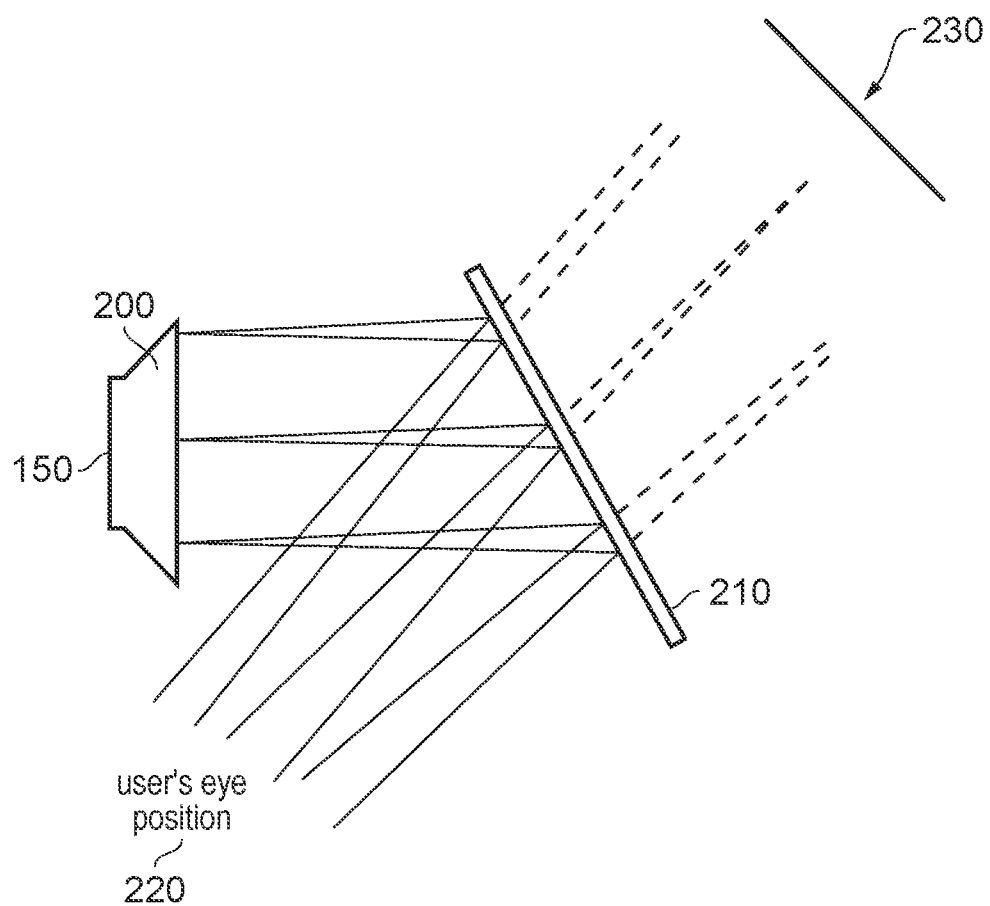
FIG. 4 schematically illustrates another type of display for use in an HMD.

An alternative arrangement is shown in FIG. 4. This arrangement may be used where it is desired that the user's view of the external environment is not entirely obscured. However, it is also applicable to HMDs in which the user's external view is wholly obscured. In the arrangement of FIG. 4, the display element 150 and optical elements 200 cooperate to provide an image which is projected onto a mirror 210, which deflects the image towards the user's eye position 220. The user perceives a virtual image to be located at a position 230 which is in front of the user and at a suitable distance from the user.

In the case of an HMD in which the user's view of the external surroundings is entirely obscured, the mirror 210 can be a substantially 100% reflective mirror. The arrangement of FIG. 4 then has the advantage that the display element and optical elements can be located closer to the centre of gravity of the user's head and to the side of the user's eyes, which can produce a less bulky HMD for the user to wear. Alternatively, if the HMD is designed not to completely obscure the user's view of the external environment, the mirror 210 can be made partially reflective so that the user sees the external environment, through the mirror 210, with the virtual image superposed over the real external environment.

Figure 5:
FIG. 5 schematically illustrates a pair of stereoscopic images.

In the case where separate respective displays are provided for each of the user's eyes, it is possible to display stereoscopic images. An example of a pair of stereoscopic images for display to the left and right eyes is shown in FIG. 5. The images exhibit a lateral displacement relative to one another, with the displacement of image features depending upon the (real or simulated) lateral separation of the cameras by which the images were captured, the angular convergence of the cameras and the (real or simulated) distance of each image feature from the camera position.

Note that the lateral displacements in FIG. 5 could in fact be the other way round, which is to say that the left eye image as drawn could in fact be the right eye image, and the right eye image as drawn could in fact be the left eye image. This is because some stereoscopic displays tend to shift objects to the right in the right eye image and to the left in the left eye image, so as to simulate the idea that the user is looking through a stereoscopic window onto the scene beyond. However, some HMDs use the arrangement shown in FIG. 5 because this gives the impression to the user that the user is viewing the scene through a pair of binoculars. The choice between these two arrangements is at the discretion of the system designer.

In some situations, an HMD may be used simply to view movies and the like. In this case, there is no change required to the apparent viewpoint of the displayed images as the user turns the user's head, for example from side to side. In other uses, however, such as those associated with virtual reality (VR) or augmented reality (AR) systems, the user's viewpoint needs to track movements with respect to a real or virtual space in which the user is located.

As mentioned above, in some uses of the HMD, such as those associated with virtual reality (VR) or augmented reality (AR) systems, the user's viewpoint needs to track movements with respect to a real or virtual space in which the user is located.

This tracking is carried out by detecting motion of the HMD and varying the apparent viewpoint of the displayed images so that the apparent viewpoint tracks the motion. The detection may be performed using any suitable arrangement (or a combination of such arrangements). Examples include the use of hardware motion detectors (such as accelerometers or gyroscopes), external cameras operable to image the HMD, and outwards-facing cameras mounted onto the HMD.

Embodiments of the present disclosure are directed towards methods of improving the reliability of inside-out tracking (that is, tracking using outwards-facing cameras mounted onto the HMD). In particular, embodiments of the present disclosure provide a more reliable tracking of peripheral devices (such as game controllers) using a camera mounted upon (or otherwise included in) an HMD.

While peripheral devices may be provided with inertial tracking units (such as accelerometers or gyroscopes), these can be rather limited in their ability to perform positional tracking due to inaccuracies. For instance, these units may be particularly susceptible to drift or noise that lead to less useful information. These issues may be partially addressed through applying processing to the inertial tracking data, but this can introduce a latency without fully addressing the problems.

Figure 6:
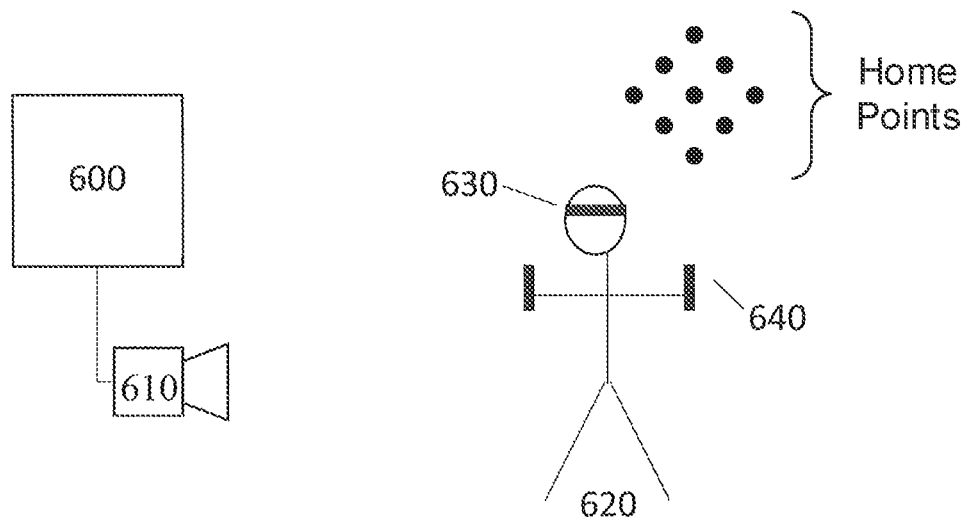
FIG. 6 schematically illustrates a tracking system according to one or more embodiments of the present disclosure.

FIG. 6 schematically illustrates a tracking system according to one or more embodiments of the present disclosure.

A processing device 600, such as a games console or a computer, is provided that is operable to execute one or more applications (such as a computer game) and provide images for display by an HMD 630 and/or another associated display. In some embodiments, this functionality may instead be integrated into the HMD 630 such that no separate processing device is required.

The processing device 600 may be associated with a camera 610 that is operable to capture images of the user 620; this may be used to capture images to be used in content being executed by the processing device, for instance, or for tracking the user if outside-in tracking is to be utilised.

The user 620 wears an HMD 630 (such as that discussed with reference to FIGS. 1 and 2) and is able to provide inputs to control processing (through motion or button presses, for example) using the peripherals 640. These peripherals 640 may have any suitable form, and may be worn by the user rather than held (for example, wristbands or the like that are affixed to the user's body or devices such as smart watches that are worn by the user). In some examples a single peripheral may be used, or more than two may be used (through a combination of worn and/or handheld devices). In some embodiments the peripherals 640 may comprise one or more buttons or other operable elements to enable user inputs; the peripherals 640 may also (or instead) include one or more markers to assist with tracking the location of the peripherals 640 with a camera.

In embodiments of the present disclosure, the peripherals 640 comprise one or more inertial measurement units (IMUs) such as accelerometers or gyroscopes. These can be used to identify the position and/or orientation of a respective peripheral throughout the operation of the peripheral by the user 620.

Figure 7:
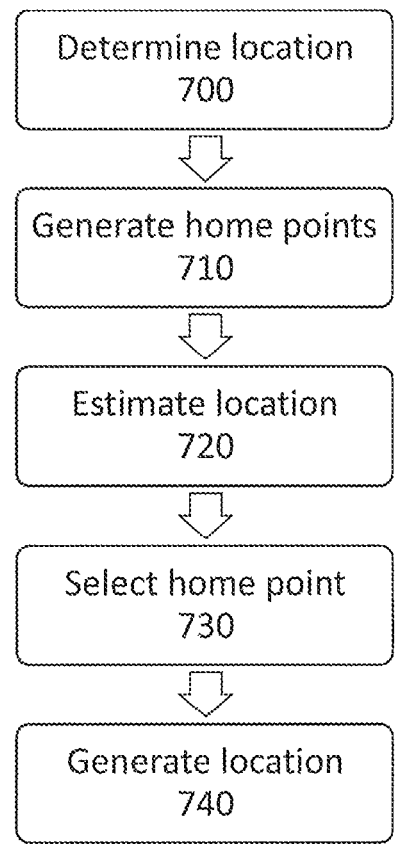
FIG. 7 schematically illustrates a method for tracking the location of one or more peripherals operated by a user.

FIG. 7 schematically illustrates a method for tracking the location of one or more peripherals operated by a user in accordance with one or more embodiments of the present disclosure. This method is concerned with the continuing of tracking a peripheral is no longer visible—this may be one of a number of peripherals that is utilised by a user, or a plurality of such peripherals. While this method may be particularly suited to an inside-out tracking arrangement (that is, one in which the location of the HMD is determined using images captured by a camera associated with the HMD), it may be equally useful for an outside-in tracking arrangement with minor modification (for instance, locating the camera elsewhere).

A step 700 comprises determining a location of the one or more peripherals in dependence upon images captured by a camera associated with an HMD worn by the user. The camera may be mounted upon the HMD or otherwise integrated—there may also be multiple cameras associated with the HMD. In some embodiments, stereoscopic cameras may be used to assist with determining the depth of objects which are imaged.

The locating of the peripherals may be performed in any suitable manner based upon the captured images. For instance, edge detection or the like may be used to identify a peripheral based upon a template or outline associated with that peripheral. Alternatively, or in addition, an active marker such as an illuminated sphere or pattern of LEDs may be provided on the peripheral to assist with identification in an image. A further alternative or additional feature may be that of a passive marker that can be used to assist with identification of the peripheral in captured images. In some embodiments, a peripheral may be configured to communicate wireless (or through a wired connection) in order to provide information to assist with identifying the peripheral in captured images—for instance, distance and direction of a peripheral may be able to be estimated based upon a wireless signal strength and this can be used to identify which portion of an image the peripheral is expected to appear in.

A step 710 comprises generating, in response to a determination by the tracking unit that one or more of the peripherals is not visible in the images (in other words, in response to a determination that a peripheral has left the tracking volume), an array of home points behind the user, the home points being locations defined in dependence upon constraints upon the user's motion. This array may include other areas of the user's environment, rather than being limited only to those areas behind the user—the array is created for a volume in which the peripheral is expected to be while it is not visible in images captured by the camera. This volume may be above the user's head, for example (see e.g., FIG. 6), and the locations of these may be determined based upon both peripheral and head motion of the user (that is, HMD motion and by association camera motion when the camera is mounted upon the HMD).

Here, 'home point' is a term for a defined location within the user's environment rather than referring to a physical element or the like. These points may be represented by markers in a virtual environment or the like, and may be visible to the user or not in dependence upon a particular implementation. In other words, an array of home points is considered to be a set of defined positions within the user's environment. These home points act as proxies for the location of the peripheral at a particular time during the operation, with a home point being selected as a likely (or at least possible) location for the peripheral to occupy at a given time.

The home points may be generated with any preferred distribution or granularity, whilst conforming to the constraints upon the user's motion. In other words, the home points may be distributed in dependence upon the possible locations of the peripheral based upon the limits of the motions that can be performed by a user—for instance, home points will not be defined for a handheld peripheral which are further away from the user than their arm length plus the peripheral length. The home points may be distributed in accordance with a predetermined model (for instance, provided by a content creator such as a game or platform developer) or with a body model of a user (or a representative user, rather than being related to a particular user).

Home points may be generated on a per-user basis and/or a per-peripheral basis as appropriate. The home points are also generated in dependence upon which part of the body the peripheral is associated with—different home points are generated for a wrist attachment than for an elbow attachment, for example.

In some embodiments the home points are generated in dependence upon a pose of the user prior to the peripheral leaving the tracking volume. For instance, if the user has a bent arm prior to the loss of image-based tracking then this places constraints upon the location of the peripheral—the user cannot instantly straighten their arm, for example. In view of such a feature, a body model may include information about the maximum and/or typical rate of motion for a user's actions so as to determine how long a pose estimate may be valid for. Such a body model may be defined for a general (representative) user, or may be developed for a specific user based upon a calibration process in which a user's motions are tracked to identify one or more aspects of their motion (such as maximum range of motion, maximum motion speed, and/or trajectories associated with reference motions). This body model may be limited to a user's upper body (this may be sufficient when using handheld peripherals) or may cover the entire body (for example). Even in the case of handheld peripherals, the use of a whole body model may be advantageous as (for instance) leg position can indicate a shift in balance, which can be indicative of upper-body motion.

A step 720 comprises estimating the respective locations of non-visible peripherals in dependence upon the output of one or more inertial measurement units associated with each peripheral. This may be based upon readings (outputs) from one or more IMUs associated with the peripheral in conjunction with a last known position from the optical tracking, for instance, or a previously estimated location. In some embodiments, the readings may instead (or additionally) be used with last-known pose information for a user's body or part of their body (such as using information about the bend in a user's arm at a recent time).

A step 730 comprises selecting a home point, from amongst the array of home points, for each of the non-visible peripherals. This selection may be performed in any suitable manner, and in dependence upon any of a number of considerations or combinations of those considerations. Examples of such considerations are provided below.

A first consideration may be that of the relative location of the peripheral (that is, the estimated location) and each home point in the array. In some cases, it may be desirable to select a home point that is closest to the estimated position of the peripheral. However, in other cases it may be desirable to select a home point that is further from the estimated position (such as a second- or third-closest) as this may reduce the likelihood of switching the selected home point for a particular peripheral throughout the tracking process.

A second consideration may be that of the velocity of the peripheral, estimated or otherwise (for instance, a last-known velocity). In this manner, a home point can be selected that is on (or at least near) a trajectory of the peripheral; this trajectory may be based upon the last-known velocity from the optical tracking, a body model which indicates constraints on user motion, and/or an estimation of the velocity.

A third consideration is that of a predicted future location based upon content being interacted with by a user. For instance, it may be inferred from context within the content that a user is likely to move a peripheral to a particular location or in a particular direction—this may be to interact with a particular virtual object, for example. For instance, in a game a user may play as an archer—in such a scenario it may be considered that if the user moves the controller outside of the tracking volume they are likely to be either pulling back the string on the bow, or reaching for an arrow. Each of these actions may be tied to a particular expected peripheral trajectory and/or final location, and as such can be used to select an appropriate home point.

A step 740 comprises generating a location for each non-visible peripheral such that the location converges towards the selected home point. The generated location for a peripheral therefore does not necessarily correspond to the estimated location of step 720—while in some cases they may be the same (in the case that the estimated location and the generated location both converge towards the selected home point), it is generally considered that the generated location is a modified estimation so as to cause the output (generated) location for the peripheral to arrive at the selected home point.

This generation may be performed so as to provide the convergence in any suitable manner—in some cases, a linear approach may be taken (such that a fixed position modifier is applied in the direction of the selected home point) or a non-linear approach may be taken (such that the modification is greater the closer to or further the estimated location is from the home point).

The rate at which the convergence is performed may be selected freely—the convergence may be performed over a predetermined number of frames or other measure of time, for example. The rate of convergence may be selected in dependence upon any number of factors, such as the distance between an estimated location and a selected home point, the type of motion, the type of peripheral, the type of content being interacted with by the user, and/or user preferences.

In some embodiments, steps 720-740 may be performed in an iterative manner such that the estimation, home point selection, and location generation are performed multiple times. This can be performed at a frame rate of the content, an update rate of an IMU at the peripheral, or any other rate. In some cases, the steps may be performed at different rates—for instance, step 740 may be repeated multiple times before an updated estimation of the peripheral location is determined based upon IMU data. Alternatively, in some cases it may be considered that step 740 is repeated alone— and that after an initial (or predetermined number of) estimation(s) according to step 720 no further estimations are performed. This may be advantageous in that the estimations may become increasingly unreliable over time due to the increased errors from sensor drift or the like. Similarly, in some cases it may be preferred that steps 730 and 740 are repeated (in any preferred ratio for a particular implementation, not necessarily equally frequently) such that the location generation and home point selection are each repeated.

Peripherals that are suitable for use in embodiments can have a variety of different forms. In the case that multiple peripherals are used, these may be identical to one another or include a range of different devices. In some cases a gamepad that is designed to be held by both of the user's hands may be provided. Alternatively, or in addition (in the case that a user does not hold the gamepad with both hands), devices may include controllers designed to be held by one of the user's hands. Any of these devices may include one or more buttons in addition to one or more IMUs. Further devices that may be considered as suitable peripherals may be those which are worn by a user, rather than held, such as wristbands (including smart watches) or other devices comprising IMUs that are able to be affixed to a user without requiring them to grip the device.

Any of these peripherals may comprise one or more additional features to assist with the tracking of the location of the respective peripheral. Examples include trackable markers that are identifiable in images of the peripheral (such as illuminated elements, or distinctive patterns such as AR markers). Alternatively, or in addition, one or more wireless communication elements may be provided that can enable a communication between peripherals and/or other devices to assist with locating the peripherals. This may be based upon a signal strength and/or direction, for instance, to assist in determining relative locations rather than providing specific position information for a peripheral.

As noted above, in some embodiments a single IMU is provided in each peripheral; however, in some cases it may be advantageous to provide multiple in a peripheral. This can enable more data to be gathered, which can enable greater accuracy and/or precision. This may be on the basis of multiple sensor types being provided (such as accelerometers, gyroscopes, and/or magnetometers), and/or sensors being provided in several locations throughout the peripheral.

Figure 8:
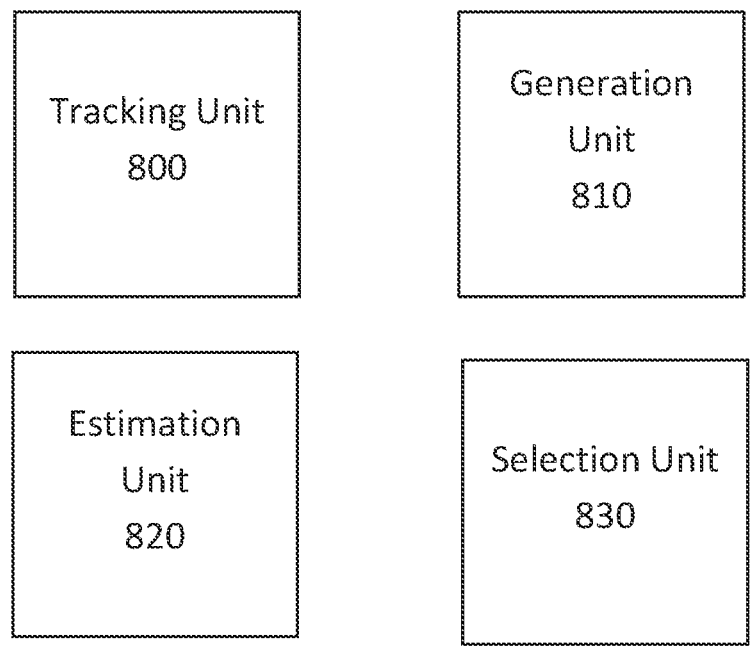
FIG. 8 schematically illustrates a system operable to track the location of one or more peripherals operated by a user.

FIG. 8 schematically illustrates a system operable to track the location of one or more peripherals operated by a user, the system comprising a tracking unit 800, a generation unit 810, an estimation unit 820, and a selection unit 830. This system can be associated with one or more cameras, any of which may be mounted upon an HMD worn by a user. The field of view of this camera (or cameras) can be used to defines a tracking volume in which peripherals are able to be tracked based upon captured images; in other words, the tracking volume is a three-dimensional region of the environment in which peripherals can be imaged. The tracking volume may be responsive to the motion of one or more of the cameras, as this can modify which parts of the environment are present in captured images.

The tracking unit 800 is operable to determine a location of the one or more peripherals in dependence upon images captured by a camera associated with an HMD worn by the user. This may be supplemented based upon information obtained from one or more inertial measurement units and/or wireless communication protocols that can be used to constrain the location of a device. The inertial measurement units may comprise any combination of one or more of each of accelerometers, gyroscopes, and/or magnetometers, for instance, or any other unit which is operable to determine motion of the peripheral.

The generation unit 810 is operable to generate, in response to a determination by the tracking unit that one or more of the peripherals is not visible in the images, an array of home points behind the user, the home points being locations defined in dependence upon constraints upon the user's motion. In some embodiments, 'not visible in the images' can mean that the peripheral is not able to be tracked—for instance, if a marker is no longer present in captured images (even if parts of the peripheral are still present in the image).

In some embodiments, it is considered that the generation unit 810 is operable to generate the array of home points in response to one or more of the peripherals leaving the tracking volume, if such a tracking volume is defined for a particular arrangement. In this case the array of home points is generated for a volume of the environment outside of the tracking volume—this may be the entire environment outside of the tracking volume, or a portion of the environment outside of the tracking volume corresponding to the most likely positions for the corresponding peripherals.

The estimation unit 820 is operable to estimate the respective locations of non-visible peripherals in dependence upon the output of one or more inertial measurement units associated with each peripheral. In some embodiments the estimation unit 820 is operable to use a body model representing the user to constrain the estimations of the peripheral locations, the body model comprising information relating to a user's range and/or speed of motion. This body model may be specific to the top half of the user's body, for the user's whole body, or otherwise tailored to a particular peripheral use. In some embodiments the model may be a representative body model for the user (such as a stock model downloaded from a server), or may be specifically generated for or tailored to that user (for instance, through a calibration process).

The estimation unit 820 may, in some embodiments, be operable to estimate a location of a peripheral in dependence upon content being interacted with by a user. For instance, based upon the content it may be possible to infer a likely action being performed by a user and based upon this determine a likely trajectory of the peripheral (that is, identify a likely trajectory approximating a trajectory required for the inferred action). This can be based upon an expected input (such as interaction with a focused-upon object), or an expected type of interaction (such as the use of a particular equipped virtual item), for example.

The selection unit 830 is operable to select a home point, from amongst the array of home points, for each of the non-visible peripherals. In some embodiments the selection unit 830 is operable to select the nearest home point to the estimated location of a peripheral; alternatively, or in addition, a predicted trajectory of the peripheral may be used to select a home point (in other words, the home point may be selected in dependence upon an expected future proximity of the peripheral location to a home point location).

Rather than selecting a home point that is used for the entire tracking process for a peripheral, the selection unit 830 may be operable to update the selected home point after a predetermined time interval has elapsed. This may be a predetermined time, or based upon an input update rate for content or the like. In some examples, the tracking unit 930 may be operable to generate a location for each non-visible tracking unit at a rate determined by the update rate of one or more associated inertial measurement units.

Following this selection, the tracking unit 800 is operable to generate a location for each non-visible peripheral such that the location converges towards the selected home point. The tracking unit 800 may be operable to generate a location with a convergence rate that is dependent upon the distance between the estimated location and the selected home point; for instance, a more aggressive convergence can be applied when the distance is larger (or when smaller, as desired depending on the implementation). The convergence rate may be linear with respect to separation changes, or may be non-linear (such as an exponential or distance squared relationship).

The arrangement of FIG. 8 is an example of a processor (for example, a GPU and/or CPU located in a games console or any other computing device) that is operable to track the location of one or more peripherals operated by a user, and in particular is operable to:

determine a location of the one or more peripherals in dependence upon images captured by a camera associated with an HMD worn by the user;

generate, in response to a determination by the tracking unit that one or more of the peripherals is not visible in the images, an array of home points behind the user, the home points being locations defined in dependence upon constraints upon the user's motion;

estimate the respective locations of non-visible peripherals in dependence upon the output of one or more inertial measurement units associated with each peripheral; and select a home point, from amongst the array of home points, for each of the non-visible peripherals; and operable to generate a location for each non-visible peripheral such that the location converges towards the selected home point.

Figure 9:
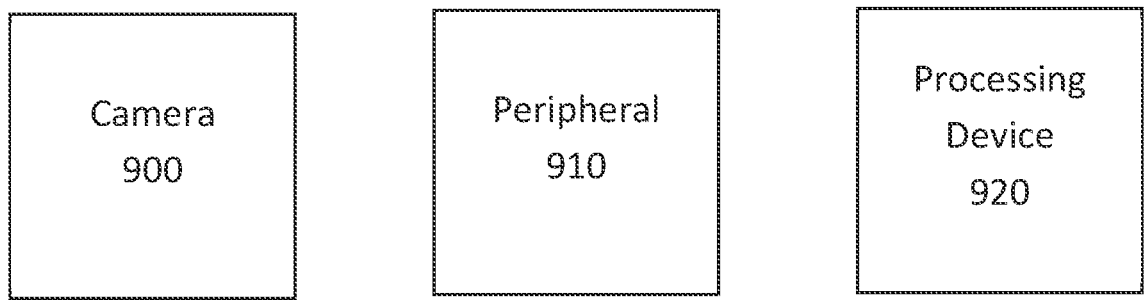
FIG. 9 schematically illustrates an arrangement for performing a tracking process in accordance with embodiments of the present disclosure.

FIG. 9 schematically illustrates an arrangement for performing a tracking process in accordance with embodiments of the present disclosure. This arrangement comprises a camera 900, a peripheral 910, and a processing device 920. These units may be provided in any suitable configuration, rather than being limited to an embodiment in which each unit is separate—for instance, an HMD may comprise elements corresponding to both the camera 900 and the processing device 920, or the peripheral 910 may comprise one or more processing elements enabling it to act as a processing device 920. It is also considered that the functionality may be divided amongst devices as appropriate—for instance, some processing (such as the optical tracking of the peripheral 910) may be performed at an HMD with the position estimation and the like being performed at an associated games console or other computing device.

The camera 900 may include any suitable configuration of camera or cameras—this may include a single camera or an array of cameras, for example. These cameras may be stereoscopic cameras or infra-red cameras in some embodiments, if this enables tracking of the peripheral or peripherals to be improved (for instance, by assisting with depth determination or identifying IR-based markers respectively). The camera 900 may be affixed to or otherwise integrated with an HMD worn by a user in some embodiments, although in others the camera 900 may be remote to the user and able to capture images of the user as well as the peripheral or peripherals.

The one or more peripherals 910, as discussed above, may include any combination of handheld or otherwise worn/operated devices comprising inertial measurement units such as accelerometers, gyroscopes, and/or magnetometers. Examples of devices include gamepads, input devices, wristbands, armbands, and devices worn around a leg or any other part of the body. These peripherals may include one or more elements to assist with their tracking, such as optically-recognisable markers or illuminated beacons (as examples of passive and active markers that may be used).

The processing device 920 may be a standalone element, such as a games console or computer, or may be incorporated into another device such as a mobile phone with a camera, an HMD, and/or a peripheral. The functions of the processing device 920 may be distributed amongst any suitable number of devices rather than being limited to a single device—these devices may be local or remote (such as a server) where appropriate.

The techniques described above may be implemented in hardware, software or combinations of the two. In the case that a software-controlled data processing apparatus is employed to implement one or more features of the embodiments, it will be appreciated that such software, and a storage or transmission medium such as a non-transitory machine-readable storage medium by which such software is provided, are also considered as embodiments of the disclosure.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

Embodiments of the present disclosure may be implemented in accordance with any one or more of the following numbered clauses:

1. A system configured to track the location of one or more peripherals operated by a user, the system comprising:
    a tracking unit configured to determine a location of the one or more peripherals in dependence upon images captured by a camera associated with an HMD worn by the user;
    a generation unit configured to generate, in response to a determination by the tracking unit that one or more of the peripherals is not visible in the images, an array of home points behind the user, the home points being locations defined in dependence upon constraints upon the user's motion;
    an estimation unit configured to estimate the respective locations of non-visible peripherals in dependence upon the output of one or more inertial measurement units associated with each peripheral; and
    a selection unit configured to select a home point, from amongst the array of home points, for each of the non-visible peripherals,
    wherein the tracking unit is configured to generate a location for each non-visible peripheral such that the location converges towards the selected home point.

2. The system of clause 1, wherein the camera is mounted upon the HMD.

3. The system of any preceding clause, wherein the field of view of the camera defines a tracking volume in which peripherals are able to be tracked based upon captured images, and
    wherein the generation unit is configured to generate the array of home points in response to one or more of the peripherals leaving the tracking volume.

4. The system of clause 3, wherein the array of home points is generated for a volume of the environment outside of the tracking volume.

5. The system of any preceding clause, wherein the inertial measurement units comprise one or more of accelerometers, gyroscopes, and/or magnetometers.

6. The system of any preceding clause, wherein the estimation unit is configured to use a body model representing the user to constrain the estimations of the peripheral locations, the body model comprising information relating to a user's range and/or speed of motion.

7. The system of any preceding clause, wherein one or more of the peripherals comprises an optically-recognisable tracking feature.

8. The system of any preceding clause, wherein the selection unit is configured to select the nearest home point to the estimated location of a peripheral.

9. The system of any preceding clause, wherein the selection unit is configured to update the selected home point after a predetermined time interval has elapsed.

10. The system of any preceding clause, wherein the tracking unit is configured to generate a location with a convergence rate that is dependent upon the distance between the estimated location and the selected home point.

11. The system of any preceding clause, wherein the estimation unit is configured to estimate a location of a peripheral in dependence upon content being interacted with by a user.

12. The system of any preceding clause, wherein the tracking unit is configured to generate a location for each non-visible tracking unit at a rate determined by the update rate of one or more associated inertial measurement units.

13. A method for tracking the location of one or more peripherals operated by a user, the method comprising:
    determining a location of the one or more peripherals in dependence upon images captured by a camera associated with an HMD worn by the user;
    generating, in response to a determination by the tracking unit that one or more of the peripherals is not visible in the images, an array of home points behind the user, the home points being locations defined in dependence upon constraints upon the user's motion;
    estimating the respective locations of non-visible peripherals in dependence upon the output of one or more inertial measurement units associated with each peripheral;
    selecting a home point, from amongst the array of home points, for each of the non-visible peripherals; and
    generating a location for each non-visible peripheral such that the location converges towards the selected home point.

14. Computer software which, when executed by a computer, causes the computer to carry out the method of clause 13.

15. A non-transitory machine-readable storage medium which stores computer software according to clause 14.

The invention claimed is:

1. A system configured to track the location of one or more peripherals operated by a user, the system comprising:
    a processor configured to implement
        a tracking unit configured to determine a location of the one or more peripherals in dependence upon images captured by a camera associated with an HMD worn by the user;
        a generation unit configured to generate, in response to a determination by the tracking unit that one or more of the peripherals is not visible in the images, an array of home points behind the user, the home points being locations defined in dependence upon constraints upon the user's motion;
        an estimation unit configured to estimate the respective locations of non-visible peripherals in dependence upon the output of one or more inertial measurement units associated with each peripheral; and
        a selection unit configured to select a home point, from amongst the array of home points, for each of the non-visible peripherals,
        wherein the tracking unit is configured to generate a location for each non-visible peripheral such that the location converges towards the selected home point.

2. The system of claim 1, wherein the camera is mounted upon the HMD.

3. The system of claim 1, wherein the field of view of the camera defines a tracking volume in which peripherals are able to be tracked based upon captured images, and
wherein the generation unit is configured to generate the array of home points in response to one or more of the peripherals leaving the tracking volume.

4. The system of claim 3, wherein the array of home points is generated for a volume of the environment outside of the tracking volume.

5. The system of claim 1, wherein the inertial measurement units comprise one or more of accelerometers, gyroscopes, and/or magnetometers.

6. The system of claim 1, wherein the estimation unit is configured to use a body model representing the user to constrain the estimations of the peripheral locations, the body model comprising information relating to a user's range and/or speed of motion.

7. The system of claim 1, wherein one or more of the peripherals comprises an optically-recognisable tracking feature.

8. The system of claim 1, wherein the selection unit is configured to select the nearest home point to the estimated location of a peripheral.

9. The system of claim 1, wherein the selection unit is configured to update the selected home point after a predetermined time interval has elapsed.

10. The system of claim 1, wherein the tracking unit is configured to generate a location with a convergence rate that is dependent upon the distance between the estimated location and the selected home point.

11. The system of claim 1, wherein the estimation unit is configured to estimate a location of a peripheral in dependence upon content being interacted with by a user.

12. The system of claim 1, wherein the tracking unit is configured to generate a location for each of the at least one non-visible peripherals at a rate determined by the update rate of one or more associated inertial measurement units.

13. A method for tracking the location of one or more peripherals operated by a user, the method comprising:
determining a location of the one or more peripherals in dependence upon images captured by a camera associated with an HMD worn by the user;
generating, in response to a determination by the tracking unit that one or more of the peripherals is not visible in the images, an array of home points behind the user, the home points being locations defined in dependence upon constraints upon the user's motion;
estimating the respective locations of non-visible peripherals in dependence upon the output of one or more inertial measurement units associated with each peripheral;
selecting a home point, from amongst the array of home points, for each of the non-visible peripherals; and
generating a location for each non-visible peripheral such that the location converges towards the selected home point.

14. A non-transitory machine-readable storage medium which stores computer software which, when executed by a computer, causes the computer to perform a method for tracking the location of one or more peripherals operated by a user, the method comprising:
determining a location of the one or more peripherals in dependence upon images captured by a camera associated with an HMD worn by the user;
generating, in response to a determination by the tracking unit that one or more of the peripherals is not visible in the images, an array of home points behind the user, the home points being locations defined in dependence upon constraints upon the user's motion;
estimating the respective locations of non-visible peripherals in dependence upon the output of one or more inertial measurement units associated with each peripheral;
selecting a home point, from amongst the array of home points, for each of the non-visible peripherals; and
generating a location for each non-visible peripheral such that the location converges towards the selected home point.

* * * * *